United States Patent
Coschera

(10) Patent No.: US 7,752,088 B1
(45) Date of Patent: Jul. 6, 2010

(54) ON SITE PHYSICAL INVENTORY METHOD

(76) Inventor: Joseph Coschera, 2120 SW. Danforth Cir., Palm City, FL (US) 34990

( * ) Notice: Subject to any disclaimer, the term of this patent is extended or adjusted under 35 U.S.C. 154(b) by 72 days.

(21) Appl. No.: 11/807,755

(22) Filed: May 30, 2007

Related U.S. Application Data

(60) Provisional application No. 60/932,070, filed on May 29, 2007.

(51) Int. Cl.
*G06Q 10/00* (2006.01)

(52) U.S. Cl. .......... 705/28; 702/182; 702/183; 700/108; 235/385

(58) Field of Classification Search .......... 705/28; 235/385; 700/214, 215, 108; 414/273; 707/3; 312/223.1; 702/182, 183, 184, 185; 455/423, 455/446; 703/22
See application file for complete search history.

(56) References Cited

U.S. PATENT DOCUMENTS

| | | | | |
|---|---|---|---|---|
| 4,783,740 A | * | 11/1988 | Ishizawa et al. | 705/28 |
| 4,920,488 A | * | 4/1990 | Filley | 705/28 |
| 5,842,179 A | * | 11/1998 | Beavers et al. | 705/28 |
| 5,949,335 A | | 9/1999 | Maynard | |
| 6,076,023 A | * | 6/2000 | Sato | 700/214 |
| 6,249,227 B1 | | 6/2001 | Brady et al. | |
| 7,062,455 B1 | | 6/2006 | Tobey | |
| 7,236,910 B1 | * | 6/2007 | Garrett et al. | 702/183 |
| 2002/0059211 A1 | * | 5/2002 | Kuramochi | 707/3 |
| 2003/0069794 A1 | | 4/2003 | Hoffman et al. | |
| 2004/0099736 A1 | * | 5/2004 | Neumark | 235/385 |
| 2004/0143428 A1 | * | 7/2004 | Rappaport et al. | 703/22 |
| 2004/0259555 A1 | * | 12/2004 | Rappaport et al. | 455/446 |
| 2006/0091207 A1 | * | 5/2006 | Chang | 235/385 |
| 2008/0103941 A1 | * | 5/2008 | Hussain | 705/28 |
| 2008/0265722 A1 | * | 10/2008 | Saliaris | 312/223.1 |
| 2009/0138313 A1 | * | 5/2009 | Morgan et al. | 705/8 |

OTHER PUBLICATIONS

"Processing Data: Choosing a System to Meet the Need." Modern Office & Data Management Feb. 1, 1980.*

* cited by examiner

*Primary Examiner*—Matthew S Gart
*Assistant Examiner*—Olusegun Goyea

(57) ABSTRACT

Providing an on site server with a data base and an on site handheld computer/scanner. Comparing and updating location input in the server database through the handheld computer/scanner at the site of physical assets being inventoried. Adding racks and rows of racks and inputting the location of the racks into the handheld computer/scanner. Specifying the location of power supplies and the type of power supplies. Designating rack unit positions and selecting manufacturer/model numbers for rack mounted devices. Entering specifications of rack mounted devices, and inputting floor mounted devices into the handheld computer/scanner. Defining floor mounted devices power connections and updating the handheld computer/scanner.

1 Claim, 9 Drawing Sheets

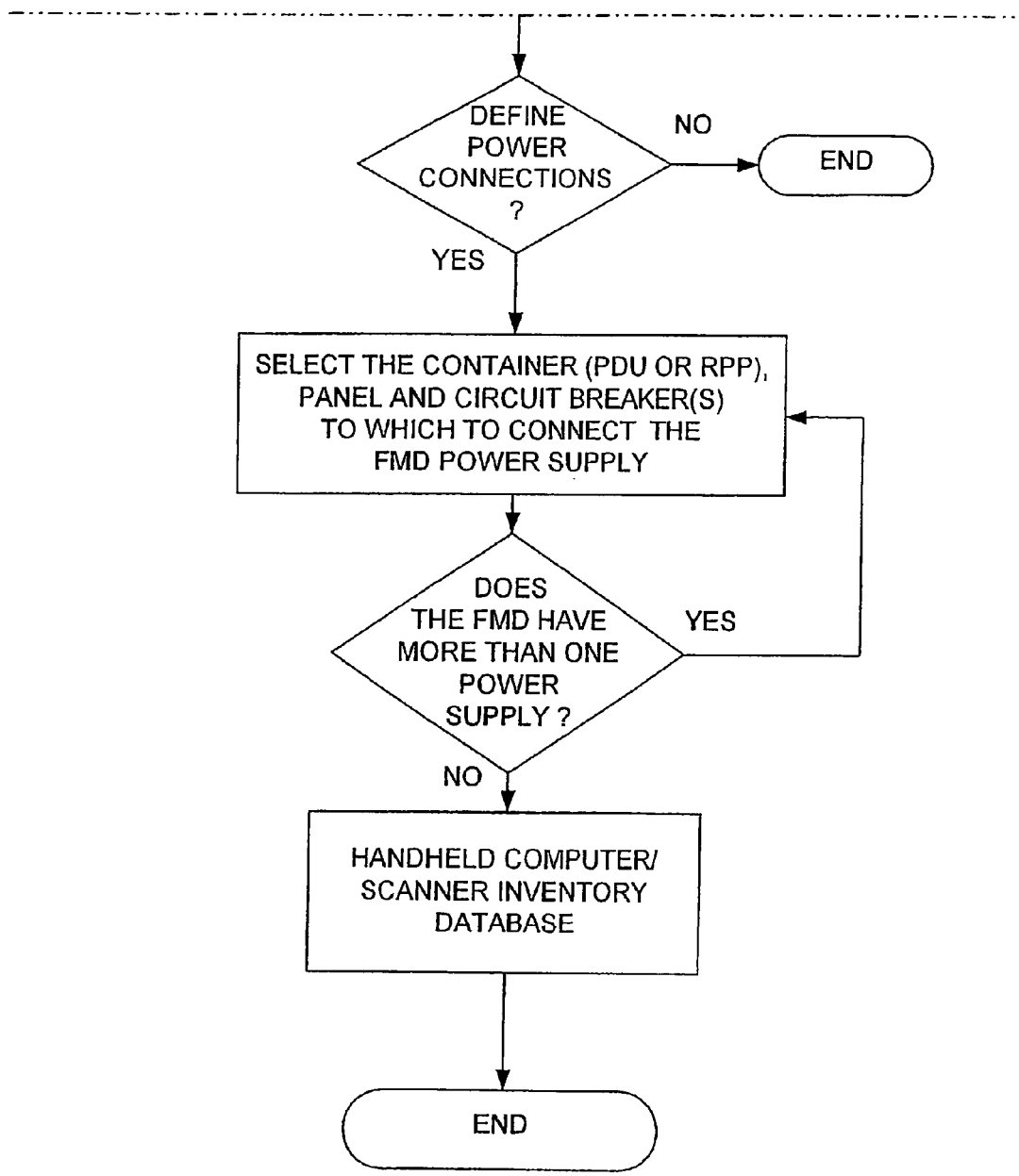

ON SITE PHYSICAL INVENTORY METHOD

RELATED APPLICATION

This application claims the benefit of the provisional application Ser. No. 60/932,070 entitled "On Site Physical Inventory", applicant Joseph Coschera, filed under Express Mail Certificate EM011680234US on May 29, 2007, the subject matter of which application is incorporated herein by reference.

BACKGROUND OF THE INVENTION

1. Field of the Invention

The present invention relates to an on site physical inventory method and more particularly pertains to a sophisticated method for collecting, processing, and validating information technology assets.

2. Description of the Prior Art

The use of computer inventory methods and apparatuses is known in the prior art. More specifically, computer inventory methods and apparatuses previously devised and utilized for the purpose of inventorying assets are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,949,335 issued Sep. 7, 1999 to Maynard discloses a RFID Tagging System for Network Assets. U.S. Pat. No. 6,249,227 issued Jun. 19, 2001 to Brady et al. discloses a RFID Integrated in Electronic Assets. U.S. Pat. No. 7,062,455 issued Jun. 13, 2006 to Tobey discloses a Method and System for Tracking Computer Hardware and Software Assets. Lastly, United States Patent Number US2003/0069794 issued Apr. 10, 2003 to Hoffman et al. discloses a System, Method, and Computer Program Product for a Supply Chain Identification Scheme for Goods.

While these devices fulfill their respective, particular objectives and requirements, the aforementioned patents do not describe the on site physical inventory method that allows a sophisticated method for collecting, processing, and validating information technology assets.

In this respect, the on site physical inventory method according to the present invention substantially departs from the conventional concepts and designs of the prior art, and in doing so provides an apparatus primarily developed for the purpose of a sophisticated method for collecting, processing, and validating information technology assets.

Therefore, it can be appreciated that there exists a continuing need for a new and improved on site physical inventory method which can be used as a sophisticated method for collecting, processing, and validating information technology, hereinafter called IT assets. In this regard, the present invention substantially fulfills this need.

SUMMARY OF THE INVENTION

In view of the foregoing disadvantages inherent in the known types of computer inventory methods and apparatuses now present in the prior art, the present invention provides an improved on site physical inventory method. As such, the general purpose of the present invention, which will be described subsequently in greater detail, is to provide a new and improved on site physical inventory method and method which has all the advantages of the prior art and none of the disadvantages.

To attain this, the present invention essentially comprises an on site physical inventory method for collecting, processing, and validating information technology assets comprising in combination:

First providing an on site server with a database able to receive and store and transmit data relating to information technology assets;

Next providing an on site handheld computer/scanner in two way communication with the server to input information technology assets relating to a client and to transmit and receive data from the server database;

Next comparing and updating location input in the server database, through the handheld computer/scanner at the site of information technology assets being inventoried;

Next adding racks and rows of racks, with their corresponding manufacturer/model number, into the handheld computer/scanner;

Next inputting the location of the racks on an X, Y grid along with the general position of their power supply into the handheld computer/scanner;

Next specifying the location of power supplies and the type of power supplies, such that rack rail positions are utilized;

Next specifying the location of the power supplies and the manufacturer/model number of the power supplies, such that rack unit positions are utilized;

Next designating rack unit positions and selecting manufacturer/model numbers for rack mounted devices;

Next entering the specifications of the rack mounted devices and their power supply connections into the handheld computer/scanner;

Next inputting floor mounted devices with their corresponding manufacturer/model number and location based on an X, Y grid into the handheld computer/scanner; and Next defining floor mounted devices power connections and updating the handheld computer/scanner.

Lastly, validating data after each comparing, updating, inputting and entering prior to any subsequent comparing, updating, inputting and entering.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved on site physical inventory method which has all of the advantages of the prior art computer inventory methods and apparatuses and none of the disadvantages.

It is another object of the present invention to provide a new and improved on site physical inventory method which may be easily and efficiently manufactured and marketed.

It is further object of the present invention to provide a new and improved on site physical inventory method which is of durable and reliable constructions.

An even further object of the present invention is to provide a new and improved on site physical inventory method which is susceptible of a low cost of manufacture with regard to both materials and labor, and which accordingly is then susceptible of low prices of sale to the consuming public, thereby making such onsite physical inventory method economically available to the buying public.

Even still another object of the present invention is to provide an on site physical inventory method for a sophisticated method for collecting and processing IT assets.

Lastly, it is an object of the present invention to provide a new and improved on site physical asset inventory method comprising the steps of providing an on site server with a data base and an on site handheld computer/scanner; comparing and updating location input in the server database through the handheld computer/scanner at the site of physical assets being inventoried; adding racks and rows of racks and inputting the location of the racks into the handheld computer/scanner; specifying the location of power supplies and the type of power supplies; designating rack unit positions and selecting manufacturer/model numbers for rack mounted devices; entering specifications of rack mounted devices, and inputting floor mounted devices into the handheld computer/scanner; and defining floor mounted devices power connections and updating the handheld computer/scanner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3B is a schematic of how to add the power supply for floor mounted devices into a handheld personal computer.

The same reference numerals refer to the same parts throughout the various Figures.

DESCRIPTION OF THE PREFERRED EMBODIMENT

Figure 1:
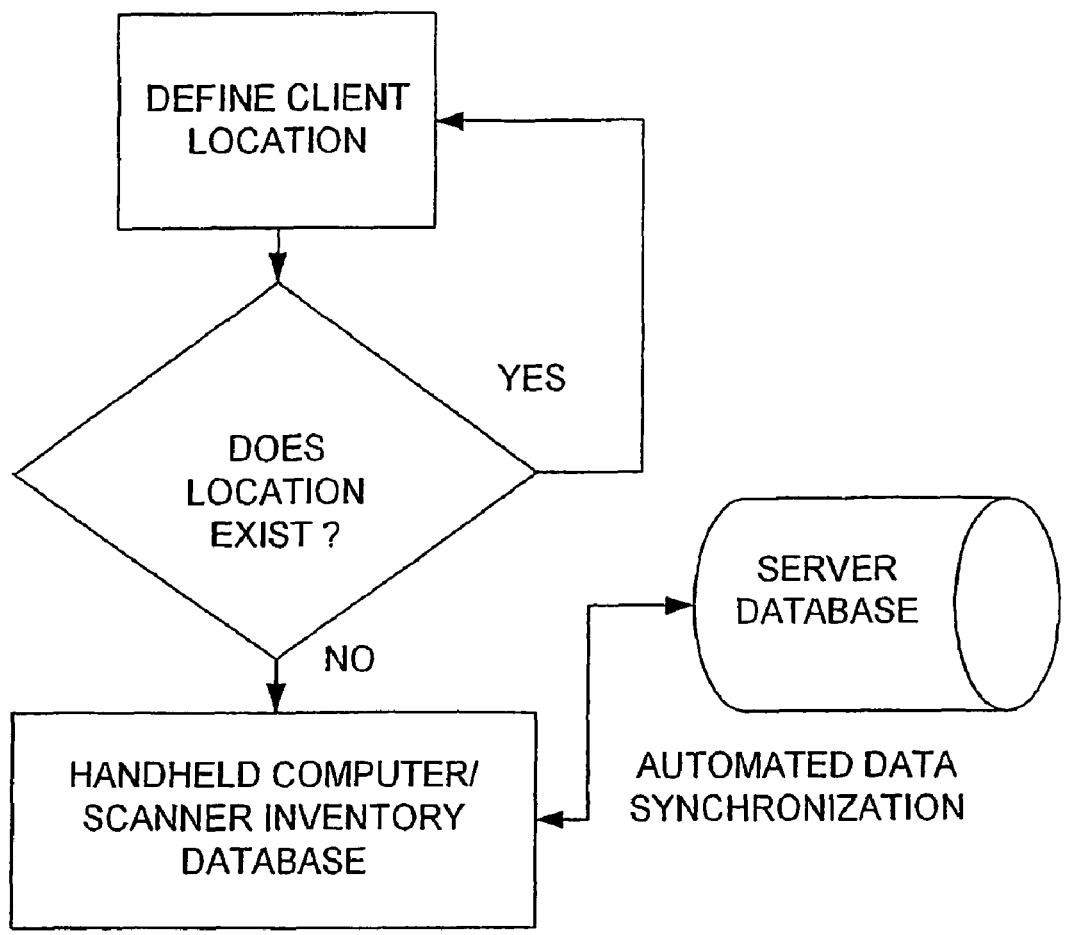
FIG. 1 is a schematic of how to add locations into a handheld personal computer.

With reference now to the drawings, and in particular to FIG. 1 thereof, the preferred embodiment of the new and improved on site physical inventory method embodying the principles and concepts of the present invention will be described.

The present invention, the on site physical inventory method is comprised of a plurality of method steps.

The primary use and design of the present invention includes a software application, On Site Physical Inventory, hereinafter called OSPI. Such system is to provide a method for inventory specialist to collect information technology, hereinafter called IT assets for use with Commercial Off The Shelf software applications, hereinafter called COST, designed for the purpose of managing IT assets. OSPI is comprised of two components. The first component is one or more on site handheld computers which the client is designed to operate utilizing the Windows Mobile Operating System, operating on a device supporting the Pocket PC technology platform. The second component is the on site server application which contains the database in which client data is stored.

The uniqueness of OSPI is that the data being collected by the inventory specialist is validated during the actual collection process. Further, the validation processes, or rules, are written to match the eventual application of the data being collected, improving cost control and giving a better understanding of business values. This ensures that the data provided will import into the IT asset application without error. The details of the OSPI method are expanded upon in the following.

The first method step of the present invention is to provide an on site server and an on site handheld computer/scanner. The server has a database capable of receiving, transmitting, storing, and validating IT assets. The handheld computer/scanner is in two way communication with the server and must also be able to transmit and receive data relating to information technology assets to and from the server database.

The second method step is to compare and update location input in the server database. The comparing and updating is through the handheld computer/scanner at the site of the information technology assets being inventoried. Validating is through the server which transmits the results back to the handheld computer/scanner. As shown in FIG. 1, when adding a location, the client's building/floor/space information is entered into the database. It is compared to existing entries, comparing the building name, floor id, space name id, and raised floor grid. If duplicate locations exist, the user is notified and asked to reenter the information. If the location does not exist, the new information goes from the handheld computer/scanner inventory database into the main server database via automated data synchronization.

Figure 2A:
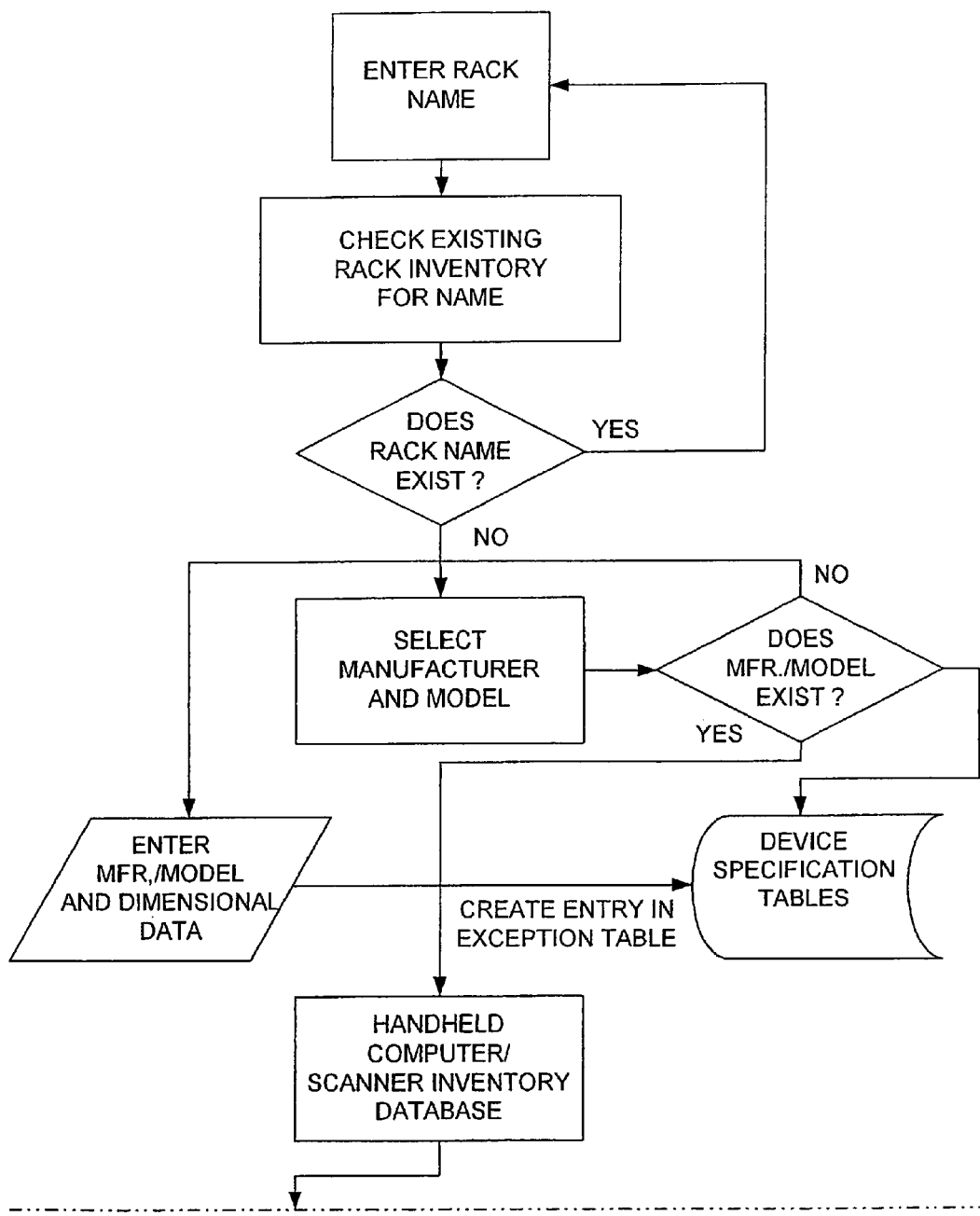
FIG. 2A is a schematic of how to add racks and rows of racks with the rack specifications into a handheld personal computer.

The third method step is to add racks or rows of racks, with their corresponding manufacturer/model number, into the handheld computer/scanner. FIG. 2A illustrates how to add a rack or row of racks. Equipment racks are added to the location while specifying a grid address location based upon the grid addressing schema defined in the step above. The rack name is checked and validated in the existing rack inventory. If duplicate racks exist, the user is notified and asked to reenter the information. If the rack does not exist, a manufacturer and model is selected from device specification tables provided by the server database and the data is entered into the handheld computer/scanner inventory database. When the manufacturer/model is not listed, the manufacturer, model, and dimensional data is entered into the handheld computer/scanner inventory database, which also creates a new entry in the device specification tables under the exception tables category. This step must be completed before rack mounted devices can be added to the inventory.

Figure 2B:
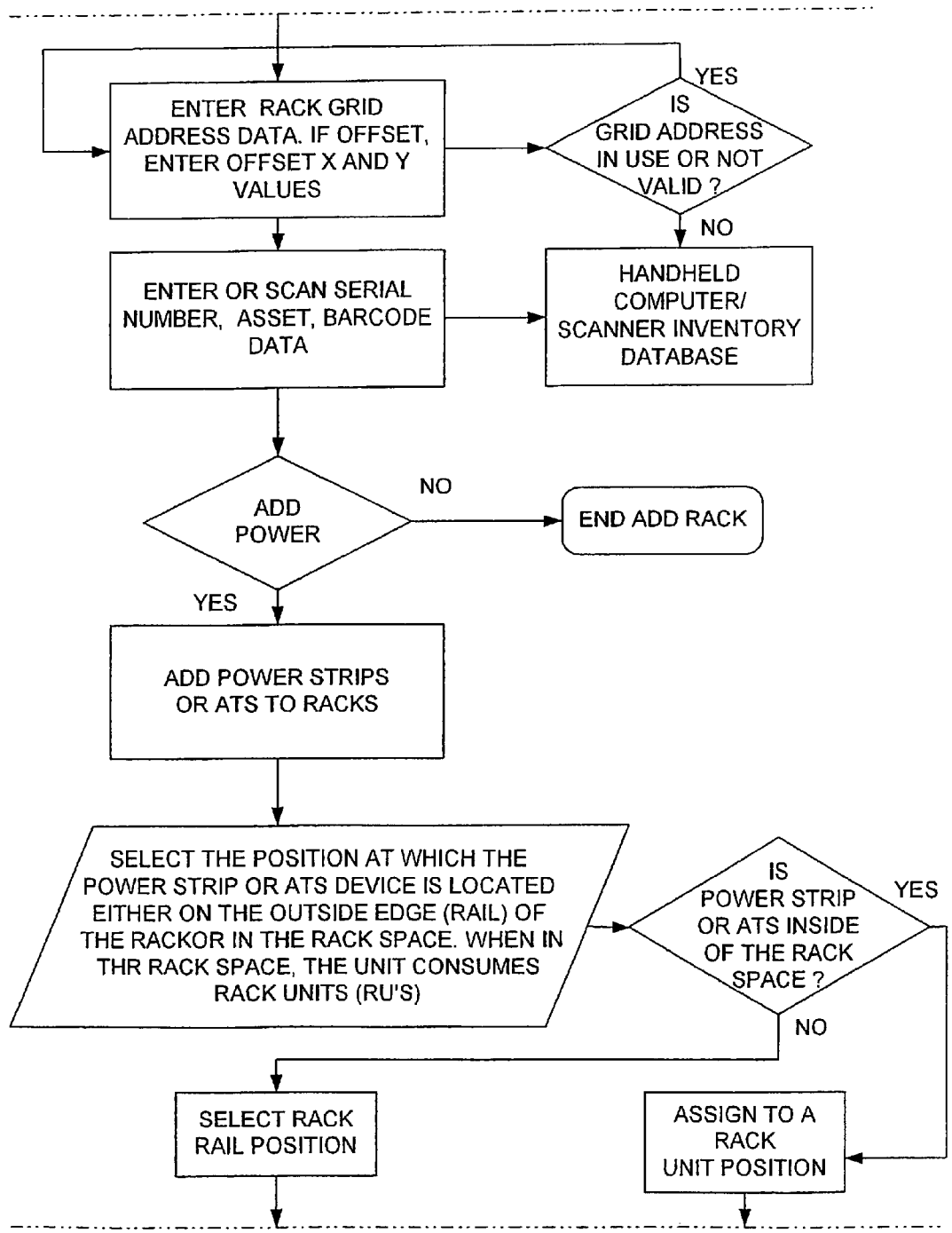
FIG. 2B is a schematic of how to add the location of the racks on an X, Y grid with their corresponding power supply in a handheld personal computer.

The fourth method step is to input the location of the racks on an X, Y grid along with the general position of their power supply into the handheld computer/scanner. As depicted in FIG. 2B, the rack location is specified and rack power is added. The grid address or raised floor tile identifier is entered. If the rack grid is offset, the offset X and Y values are input in the handheld computer/scanner. This data is based on the physical position of the left rear corner of the rack. The grid display information is based on client preference. The serial number, asset tag, or barcode data of the rack is entered or scanned into the handheld computer/scanner inventory database. Next add the rack power supplies. Rack power can consist of any combination of power strips mounted outside or inside of the rack as well as automated transfer switches, hereinafter called ATS, and rack mounted power distribution units, hereinafter called PDU, and remote power panels, hereinafter called RPP. If no rack power is present, end the add rack process. If rack power is available, add the power strips or ATS pertaining to the racks into the handheld computer/scanner. Select the position at which the power strips/ATS devices are located, either on the outside edge, also called rail, of the rack or in the rack space. When in the rack space, the unit consumes rack units, hereinafter called RU.

Figure 2C:
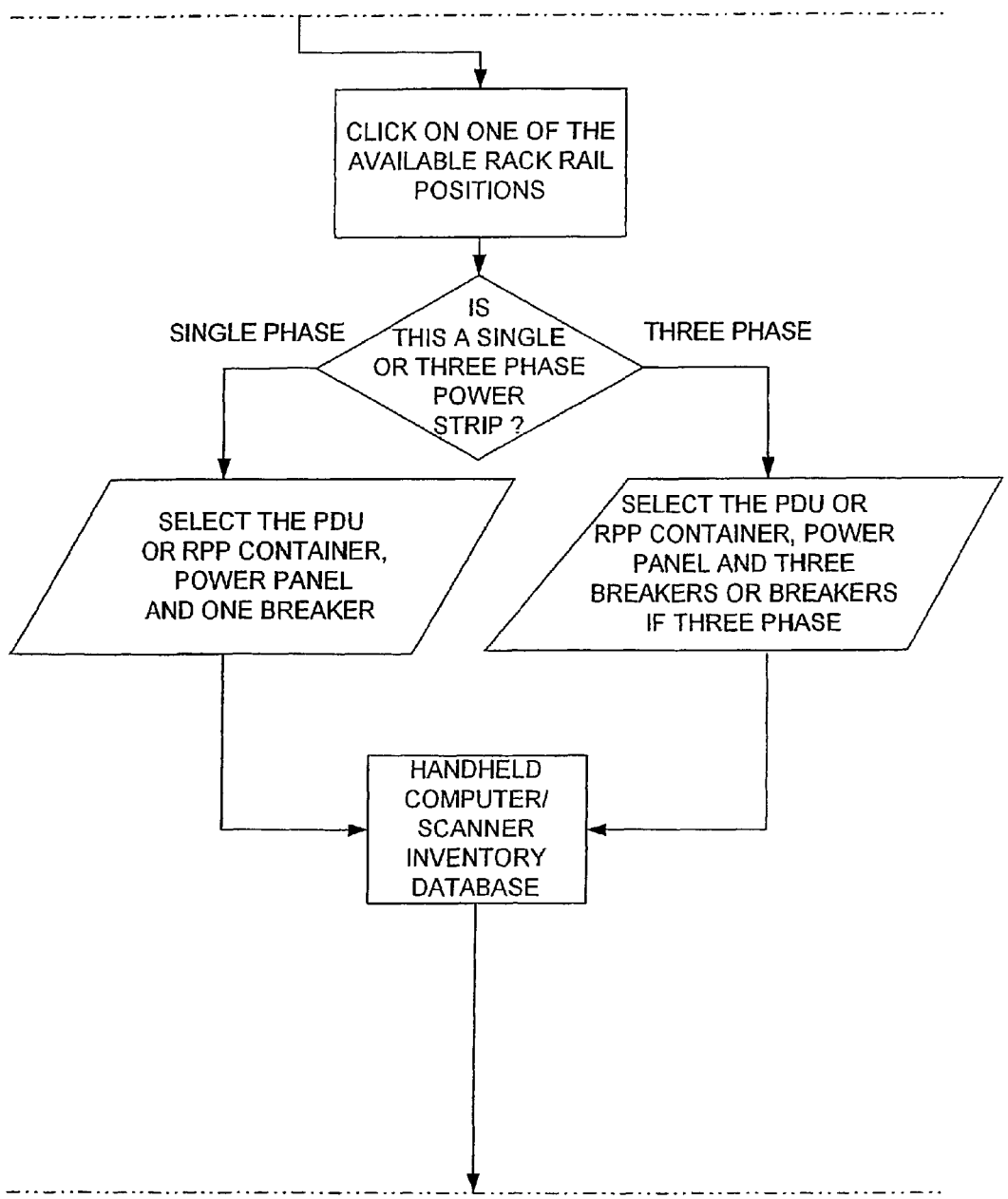
FIG. 2C is a schematic of how to select the position of a rack power supply into a handheld personal computer, such that it does not utilize a rack unit position.

The fifth method step is to specify on the location of the power supplies and the types of power supplies, such that they utilize rack rail positions. FIG. 2C illustrates how to deal with the rack rail position of the power strips. If the power strips/ATS are not inside the rack space, click on one of the available rack rail positions in the handheld computer/scanner. Power strips that are attached to the rear of the rack must be assigned a location that does not utilize an RU position. For single phase power strips, select the PDU or RPP container, power panel, and one breaker into the handheld computer/scanner inventory database. For three phase power strips, select the PDU or RPP container, power panel, and three breakers or three-phase breakers into the handheld computer/scanner inventory database.

Figure 2D:
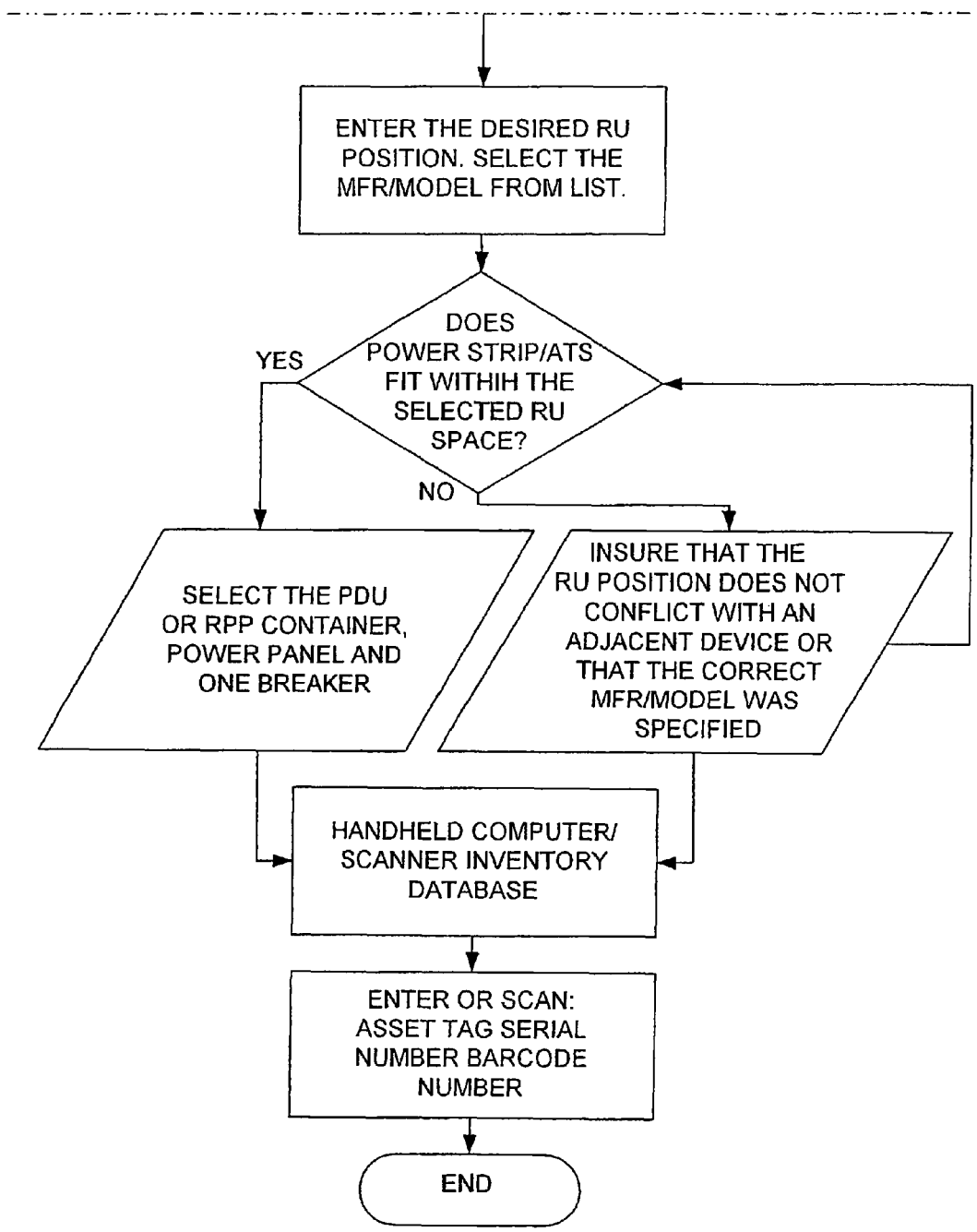
FIG. 2D is a schematic of how to select the position of a rack power supply with its specifications into a handheld personal computer, such that it utilizes a rack unit position.

The sixth step is to specify on the location of the power supplies and their manufacturer/model numbers, such that they utilize RU positions. As shown in FIG. 2D, power strips or ATS devices that are mounted inside of the rack must be assigned an RU position, and their manufacturer/model numbers must be selected from the list in the handheld computer/scanner. If a power strip/ATS does not fit within the selected RU space, insure that the RU position does not conflict with an adjacent device or that the correct manufacturer/model was selected. Once establishing that the power strip/ATS fits within the selected RU space, select the PDU or RPP container, power panel, and one breaker. Input this into the handheld computer/scanner inventory database and enter or scan the asset tag, serial number, or barcode number, which ends the addition of rack power supplies.

Figure 2E:
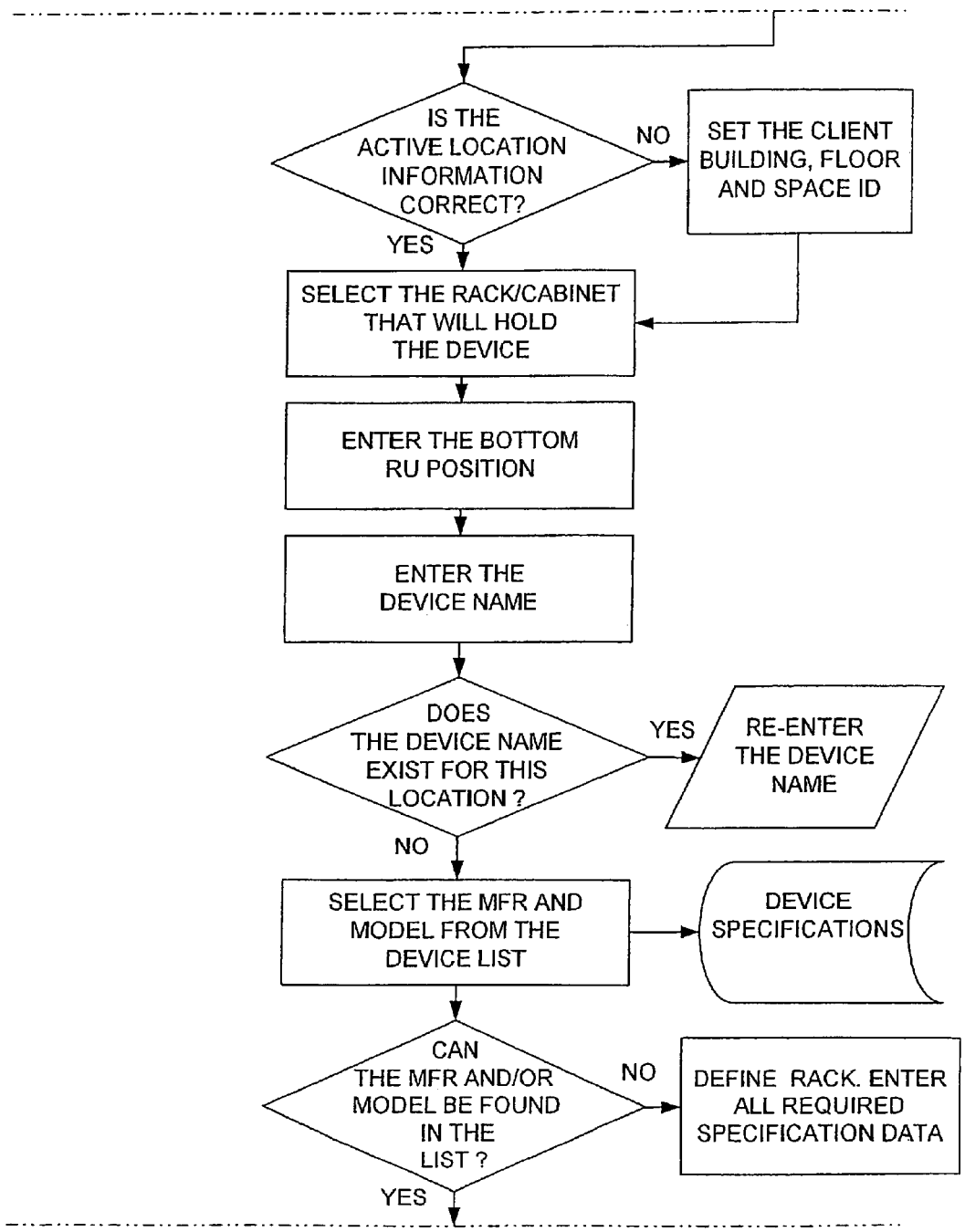
FIG. 2E is a schematic of how to add rack mounted devices with the device specification to a rack unit position in a handheld personal computer.

The seventh step is to designate RU positions and select manufacturer/model numbers for rack mounted devices. FIG. 2E begins the process of adding rack mounted devices. Devices that are rack mounted must be assigned to an RU position within the rack. Check to be sure the active location information, client building, floor, and space id, are correct. The placement, its relative position to devices above and below it, as well as its assigned name, manufacturer, and model are validated during the entry process. Select the rack/cabinet that will hold the device. Enter the bottom RU position and the device name. A notification will be given for duplicate device names existing for the same location, and the user will be asked to reenter the information. If the device name and location does not already exist, select the manufacturer and model from the Device List provided by the server database that gives the device specifications. For manufacturers and/or models that cannot be found on the list, define the rack and enter all required specification data to proceed to the next steps.

Figure 2F:
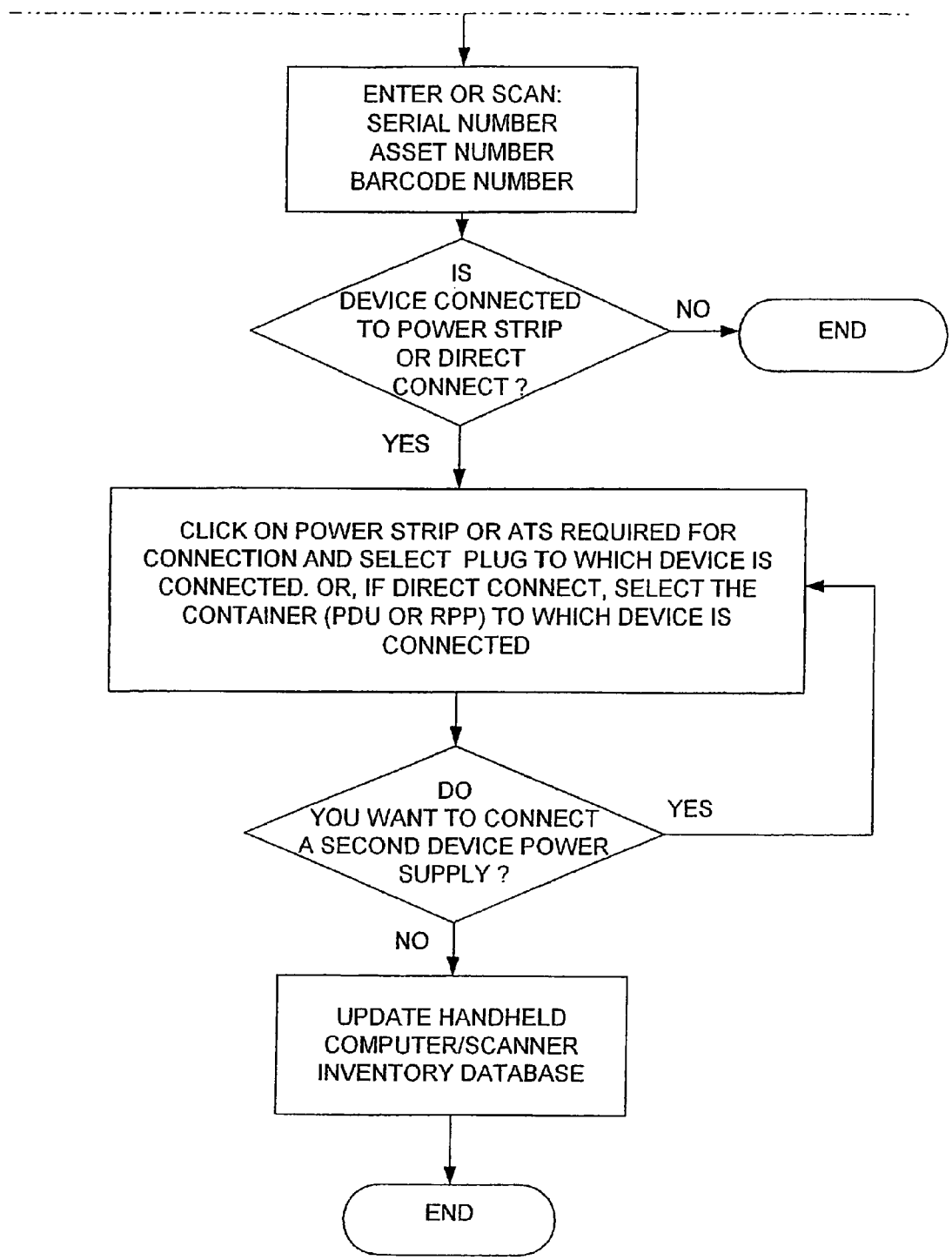
FIG. 2F is a schematic of how to add the power supply of rack mounted devices into a handheld personal computer.

The eighth step is to enter the specifications of the rack mounted devices and their connections to power supplies into the handheld computer/scanner. A continuation of the rack mounted devices process is illustrated in FIG. 2F. Enter or scan the serial number, asset tag, or barcode number of the rack mounted device and connect the device to either a power strip or direct connect. If power is not needed, simply end the addition of rack mounted devices. If power is needed, click on power strip or ATS required for connection and select the plug to which the device is connected. Or, if direct connect, select the PDU or RPP container to which device is connected. Update the handheld computer/scanner inventory database and end the process for adding rack mounted device. When connecting the same device to a second power supply, repeat the steps dealing with the power connections for rack mounted devices before updating the handheld computer/scanner inventory database.

Figure 3A:
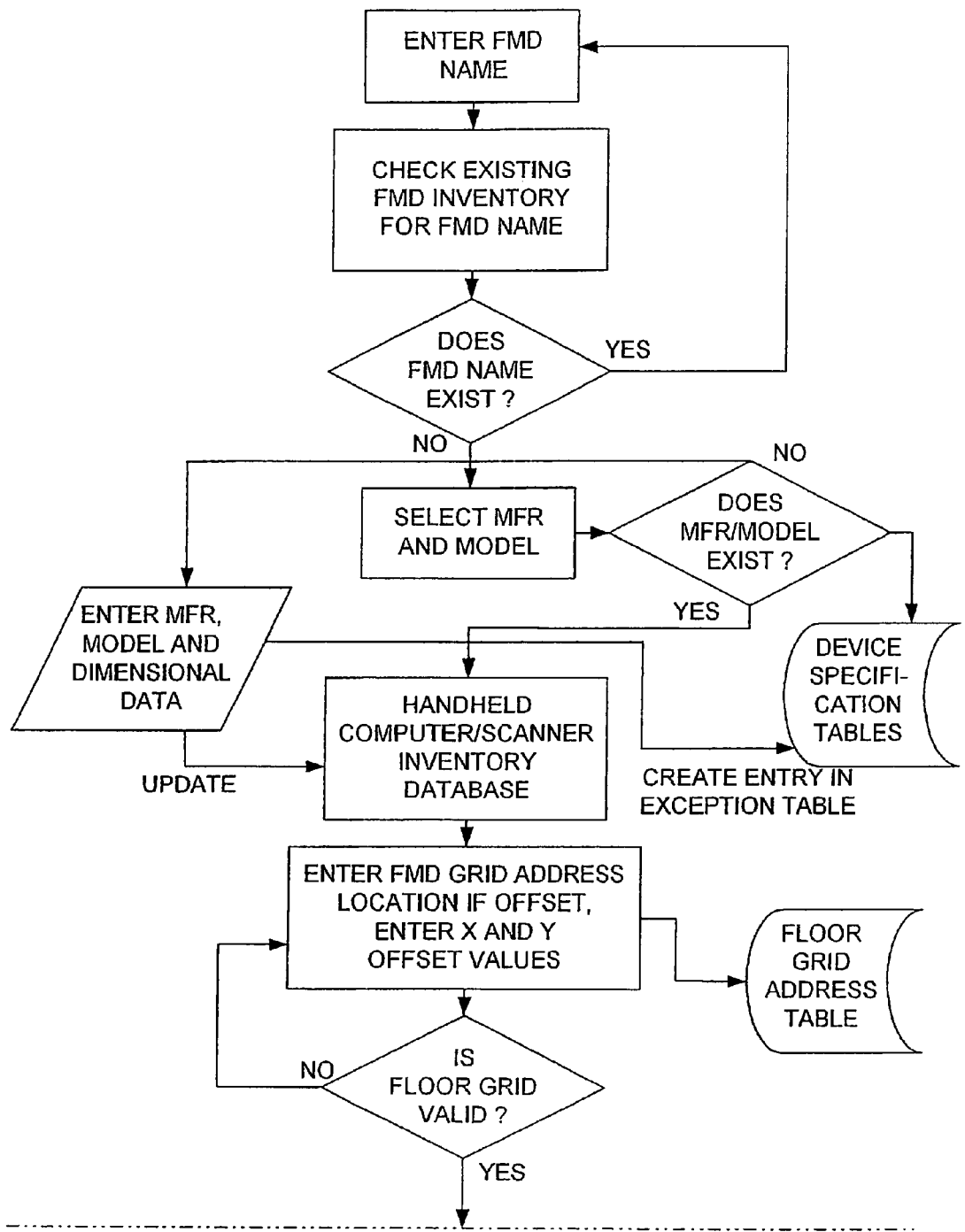
FIG. 3A is a schematic of how to add floor mounted devices along with their corresponding location on an X, Y grid in a handheld personal computer.

The ninth step is to input floor mounted devices, hereinafter called FMD, with their corresponding manufacturer/model numbers and locations based on an X, Y grid in the handheld computer/scanner. In FIG. 3A, FMDs are added to the location by specifying a grid address location based upon the grid addressing schema defined during the step for adding a location. FMD names are checked and validated in the existing FMD inventory. If duplicate FMD names exist, the user is notified and asked to reenter the information. If the name does not exist, a manufacturer and model is selected from device specification tables provided by the server database and the data is entered into the handheld computer/scanner inventory database. For manufacturers/models that are not listed, the new manufacturer, model, and dimensional data is entered into the handheld computer/scanner inventory database, which also creates a new entry in the device specification tables under the exception tables category. The FMD grid address location is added to the floor grid address table in the server database. When the FMD grid is offset, the offset X and Y values are entered. Continue to the next steps if the floor grid is valid. If the floor grid is not valid, enter the FMD grid address location again. These steps must be completed before rack mounted devices can be added to the inventory.

The tenth step is to define the FMD power connections and update the handheld computer/scanner. How to add power to FMDs is depicted in FIG. 3B. First define the power connections for the FMDs. If no power connections are made, end the process for adding FMDs. If power connections are present, select the PDU or RPP container, panel, and circuit breaker(s) which connect to the FMD power supply. When more than one power supply is needed for the FMD, repeat the steps for defining FMD power connections. When finished, save the data in the handheld computer/scanner inventory database, ending the addition of FMDs.

The eleventh and last step is the step of validating data after each comparing, updating, inputting and entering prior to any subsequent comparing, updating, inputting and entering.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An on site physical information technology asset inventory method including the steps of:
   providing an on site handheld computer with a database containing preliminary site location data;
   entering a physical site location data and comparing the preliminary site location data in the database with the physical site location data at the site of the physical assets being inventoried;
   adding rows of computer racks, floor mounted devices and computer rack mounted devices to the site;
   inputting specific floor location data of the rows of computer racks, floor mounted devices and computer rack mounted devices while simultaneously validating the accuracy of the specific floor location data entered, insuring that the selected specific floor location is not occupied and that the selected floor location position will not cause interference with a previously inventoried device;
   storing the information into the database of the handheld computer; wherein the specific floor location data entered includes data relating to raised floor grid address, X/Y offset values and rotational position;
   entering the specific floor location data includes inputting X/Y offset values and other specific data of power sources, and simultaneously validating the specific floor location data and other specific data of such power sources, wherein the other specific data includes a power distribution unit, a power distribution unit's power panel, and a power panel's circuit breaker selected, and insuring that the previously selected floor location including X/Y offset values is not occupied and that the selected floor location including X/Y offset values will not cause interference with a previously inventoried device, while allowing a user to override such interference;
   designating computer rack unit positions while simultaneously validating the computer rack unit positions for insuring that the previously selected rack unit position is not occupied and that any of the selected rack unit positions will not cause interference with a previously inventoried device, while allowing the user to override such interference;
   providing a list of predefined manufacturer/model number specifications and then selecting and entering into the database of the handheld computer manufacturer/model number specifications for computer rack mounted devices from the list;
   entering and inputting specifications of the computer rack mounted devices into the database of the handheld computer;
   providing a user the ability to enter a user defined manufacturer/model number specification into the database of the handheld computer if it is not provided in the predefined list of manufacturer/model number specifications;
   defining and inputting rack mounted devices power sources and updating the database of the handheld computer then validating that the power sources selected are not assigned to another floor mounted device and any other device causing warning messages to be displayed, while allowing the user to override such warning messages;
   entering and inputting specifications of the floor mounted devices into the database of the handheld computer;
   providing the user the ability to enter a user defined manufacturer/model number specification into the database if it is not provided in the predefined list of manufacturer/model number specifications;
   defining and inputting floor mounted devices power sources and updating the database of the handheld computer then validating that the power sources selected are not assigned to another floor mounted device and any other device causing warning messages to be displayed, while allowing the user to override such warning messages;
   providing an on site server with a server database wherein the server and handheld computer are in communication to synchronize the data between the handheld computer and to the server database; and
   updating the server database to conform to the database of the handheld computer.

* * * * *